M. A. ROLLMAN AND C. J. SCHIEMER.
FRUIT PRESS.
APPLICATION FILED JAN. 30, 1915.
1,317,666.
Patented Sept. 30, 1919.
2 SHEETS—SHEET 1.
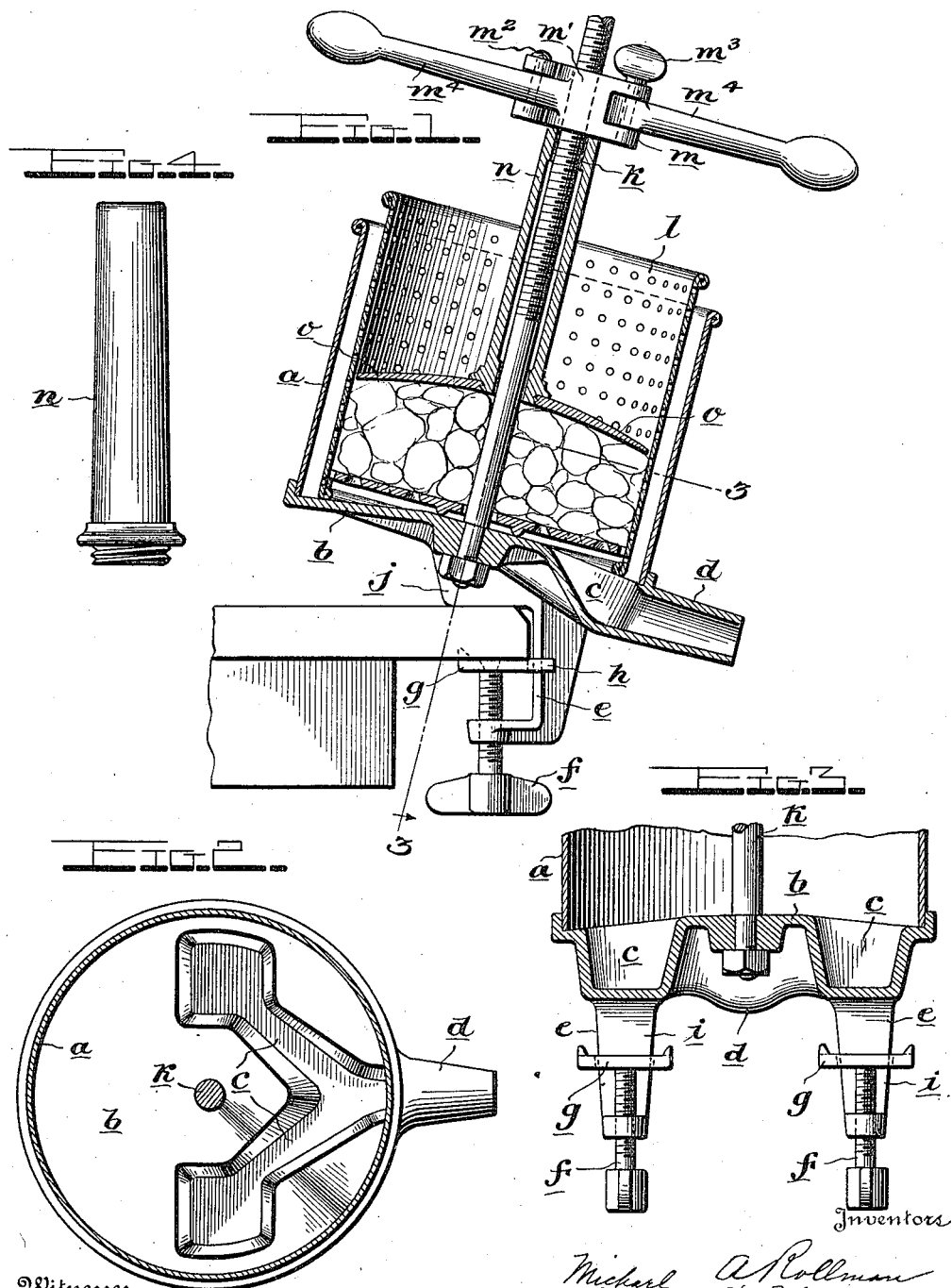

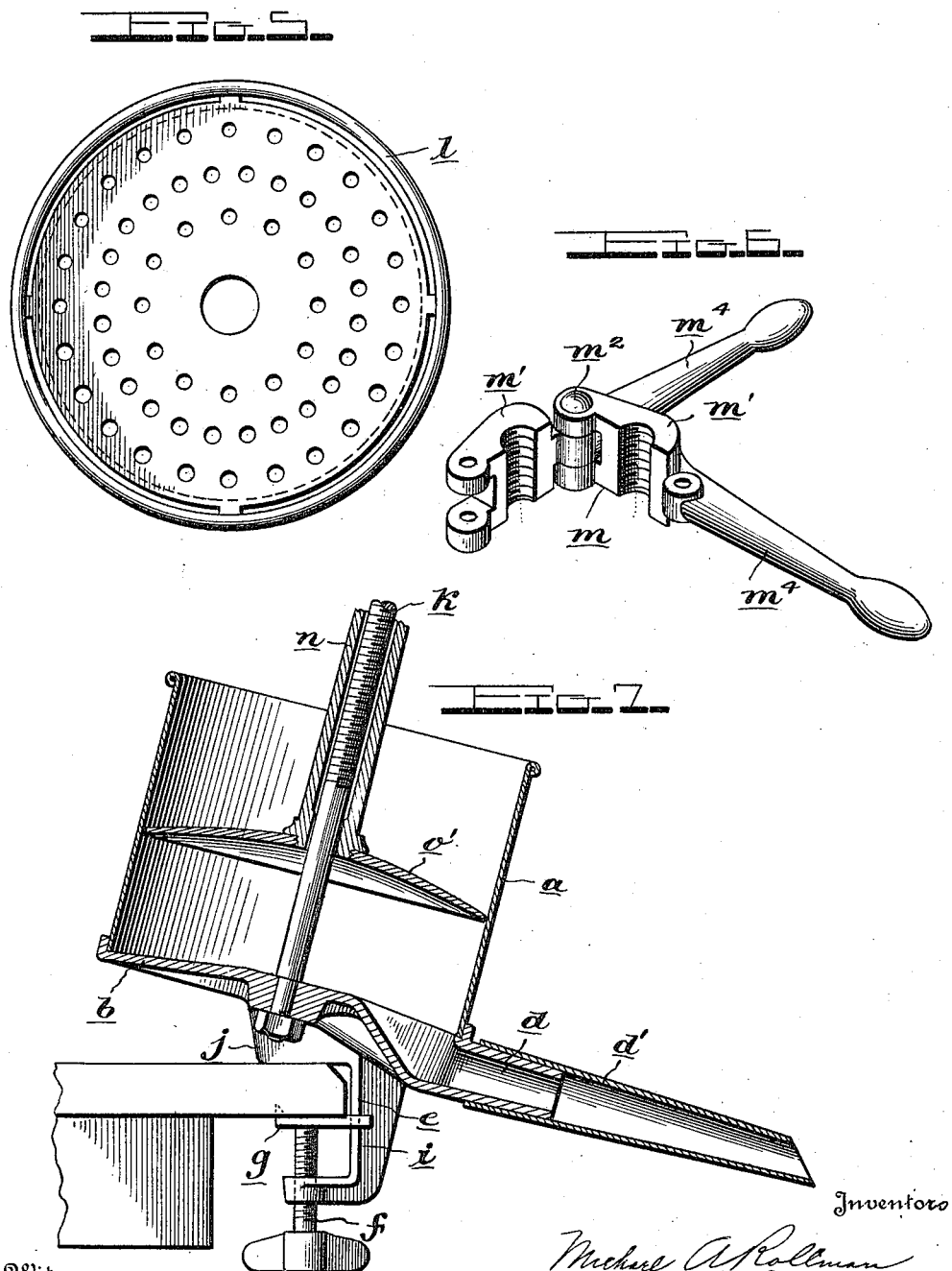

UNITED STATES PATENT OFFICE.

MICHAEL A. ROLLMAN AND CHARLES J. SCHIEMER, OF MOUNT JOY, PENNSYLVANIA.

FRUIT-PRESS.

1,317,666. Specification of Letters Patent. Patented Sept. 30, 1919.

Application filed January 30, 1915. Serial No. 5,279.

*To all whom it may concern:*

Be it known that we, MICHAEL A. ROLLMAN and CHARLES J. SCHIEMER, citizens of the United States of America, and residents of Mount Joy, county of Lancaster, State of Pennsylvania, have invented certain new and useful Improvements in Fruit-Presses, of which the following is a full and clear specification, reference being had to the accompanying drawings, in which—

Figure 1 is a vertical sectional view of my apparatus adjusted for use as a press for pressing the juice from fruits, etc.;

Fig. 2 a transverse section showing the formation of the collecting and draining groove in the bottom of the hopper.

Fig. 3 a transverse sectional view on the line 3—3 of Fig. 1;

Fig. 4 a detail side elevation of the spacing sleeve removably attached to the plunger;

Fig. 5 a plan view of the fruit holder;

Fig. 6 a detail perspective view of the removable two-arm lever-nut; and

Fig. 7 a vertical sectional view showing the apparatus adapted for use as a sausage filler.

The object of this invention is to so construct the apparatus that it may be inexpensively manufactured, will be durable in use and convenient and easy to operate, as more fully hereinafter set forth. A further object is to so construct the apparatus that it may be readily converted into a sausage stuffing apparatus, as more fully hereinafter set forth.

In the drawings, $a$ designates a cylindrical hopper fastened to a circular cast iron base or bottom $b$ having formed in it depression $c$ adapted to receive the juices from the fruit and conduct them to a spout $d$ formed integrally with said bottom plate. The apparatus is adapted to be removably fastened to a support by means of a clamping device consisting of depending arms $e$, each carrying the usual set screw $f$, upon the upper end of which is swiveled a clamp plate $g$, each clamp plate being guided in its up and down movements by having its front edge cast with hooks $h$ which engage vertical flanges $i$ on the adjacent depending arm. The plates $g$ form the lower members of the clamp, and the upper members are formed by lugs $j$ which are formed integrally with the bottom plate $b$ by the depressing of the drain groove $c$. From the part which empties into the spout $d$, this drain groove $c$ branches rearwardly, one branch extending to either side of the center of the bottom plate. It is the deeper rearmost ends of these two branches of the drain groove that form the clamp lugs $j$.

Affixed centrally to the bottom plate $b$ is a screw rod $k$ which extends upwardly to a point outside of the hopper. Within the hopper is removably mounted a straining hopper $l$, whose bottom is centrally perforated for the passage of the rod $k$ and whose bottom and side walls are perforated for the escape of the juices out into the main hopper. Removably connected to the rod $k$ is a lever-nut $m$ which, when screwed down on the bolt, is forced against the upper end of a sleeve $n$ surrounding the screw and carrying at its lower end a suitable pressure or plunger plate $o$.

It will be observed that the supporting and clamping lugs $j$ have their lower or clamping faces horizontal, while the bottom plate $b$ inclines downwardly and forwardly with respect thereto, so that both hoppers as well as the screw rod incline forwardly when the apparatus is clamped to a supporting table or shelf. The advantage in thus inclining the screw and other parts is that the parts will thus be in position for the greatest degree of convenience on the part of the operator, since the operator will naturally stand in front of the apparatus and the screw will thus incline toward him, thus enabling the operator to apply the greatest degree of power while standing in an easy position.

The sleeve $n$ and the pressure disk $o$ are readily slid off the end of the screw after the lever-nut is removed therefrom, and, furthermore, the pressure disk may be readily detached from the sleeve, since it is removably screwed on to the lower end thereof. This removability of the pressure disk is advantageous in that it enables the substitution of a larger disk ($o'$) when it is desired to use the apparatus for pressing a substance without the use of the straining hopper $l$, as shown in Fig. 7. This use of the device is desirable where the apparatus is adapted for sausage stuffing, and, when used for this purpose, it is desirable also to removably attach to spout $d$ a supplemental sausage filling spout $d'$. The arrangement of the draining groove $c$ and the inclining of the bottom of the hopper downwardly and forwardly especially adapts this apparatus for being converted into a sausage stuffing machine; and this arrangement of the drain groove and hopper bottom is advantageous also when the apparatus is used for its main purpose, namely, for fruit pressing, since quick and thorough draining of the juice is obtained.

It is obvious that we may use any kind or type of lever-nut found desirable, but we prefer using the device illustrated, which consists of a nut body divided vertically to form two parts $m'$ permanently hinged together by a pin $m^2$ and adapted to be temporarily closed by a removable pin $m^3$, each of the parts $m'$ being provided with a handle or lever $m^4$. The two parts of the device are constructed exactly alike, so that they are interchangeable; this greatly facilitates manufacture and assembling, as is obvious. After the removal of the pin $m^3$, the nut may be opened out, as shown in Fig. 6, whereupon it may be applied to the screw at any point in the length thereof; this enables the nut to be placed on the screw close to the upper end of the sleeve $m$ and thus avoids the necessity of screwing the nut down from the upper end of the screw, as would be necessary were the nut a solid or non-separable one.

Another advantage in inclining the screw rod forwardly with respect to the clamping surface of the clamping members is that the force applied to turn the nut will be less liable to twist the machine off the table than in those machines where the screw stands straight up and the power, therefore, tends to swing or twist the machine in a horizontal direction away from the table, in which latter case any considerable application of power to the lever nut will tend strongly to twist the machine off the edge of the table.

Having thus described our invention, what we claim is:

1. In a press of the class set forth, a hopper and means for supporting and anchoring it, a removable straining hopper, a central upstanding screw rod, a lever-nut on the rod, a sleeve loosely slidable on the rod, and a plurality of different sized pressure plates each of which is capable of being removably attached to the lower end of said sleeve, whereby the straining hopper may be removed from the apparatus and a pressure plate substituted which will be adapted for use with the outer or main hopper.

2. In a press of the class set forth; a main hopper provided with a bottom plate; an upstanding screw anchored to the bottom plate; a straining hopper having a perforated bottom plate, this straining hopper and its bottom plate being bodily removable together from the main hopper; and a pressure means mounted on the screw.

3. In combination with a main hopper having a bottom plate, this bottom plate being provided with depressed diverging portions forming a drain groove, these depressions forming a pair of separated lugs $j$ whose under surfaces are horizontal while the body of the plate inclines downwardly and forwardly; means carried by the bottom plate and adapted to coöperate with said lugs to form a table clamp; and expressing means mounted on the bottom plate above the drain grooves therein.

In testimony whereof we hereunto affix our signatures in the presence of two witnesses.

MICHAEL A. ROLLMAN.
CHAS. J. SCHIEMER.

Witnesses:
ANNA HEISEY,
CHAS. G. DE LONG.

Copies of this patent may be obtained for five cents each, by addressing the "Commissioner of Patents, Washington, D. C."